R. H. BANKS.
SURGICAL BANDAGE AND FASTENER THEREFOR.
APPLICATION FILED JULY 10, 1916.

1,212,731. Patented Jan. 16, 1917.

WITNESSES
J. Herbert Bradley.
E. B. Motter

INVENTOR
R. H. Banks.

UNITED STATES PATENT OFFICE.

REEVE H. BANKS, OF PITTSBURGH, PENNSYLVANIA.

SURGICAL BANDAGE AND FASTENER THEREFOR.

1,212,731. Specification of Letters Patent. Patented Jan. 16, 1917.

Application filed July 10, 1916. Serial No. 108,471.

*To all whom it may concern:*

Be it known that I, REEVE H. BANKS, a citizen of the United States, and resident of Pittsburgh, in the county of Allegheny and State of Pennsylvania, have invented certain new and useful Improvements in Surgical Bandages and Fasteners Therefor, of which the following is a specification.

The usual way of securing a surgical bandage in place is to sew or tie the free end of the bandage strip, and ordinarily the bandage or at least the secured end thereof must be cut in order to remove it, or to loosen or tighten the wrapping.

The object of the present invention is to provide a device by means of which the bandage may be instantly secured and as readily released without damaging the same, the fastener being removably applied to the bandage after the latter has been wrapped around the injured part, it being unnecessary to previously secure the fastener to the bandage.

A further feature and advantage is the adjustability of the fastener whereby the bandage may be loosened or tightened without removing or releasing it.

Figure 1:
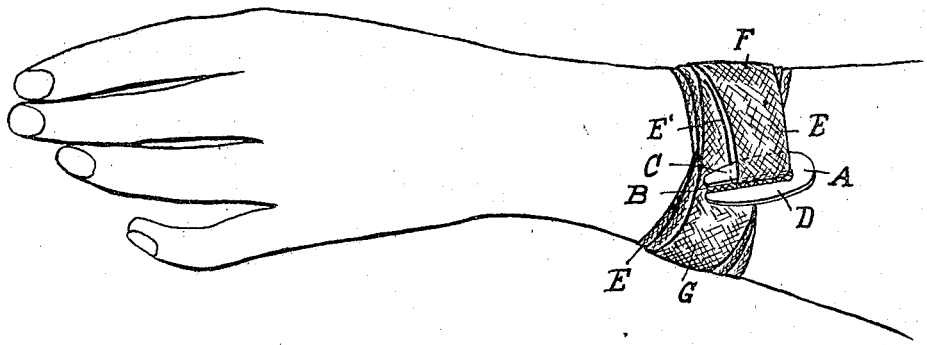
Figure 2:
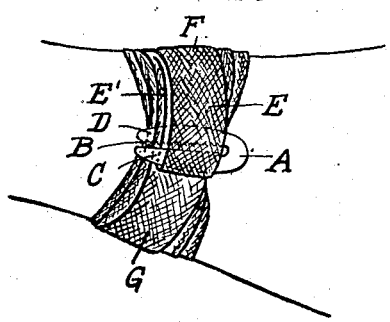
Figure 3:
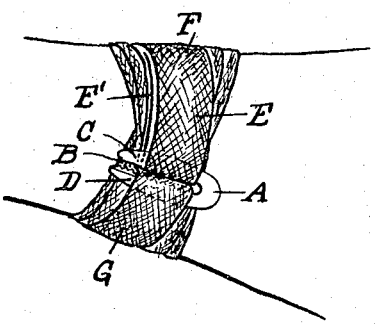
Figure 4:
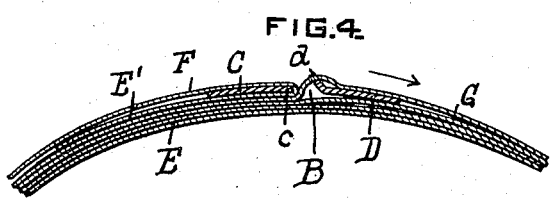
Figure 5:
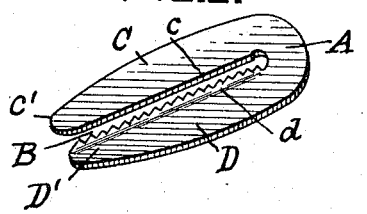

In the accompanying drawings, Figure 1 is a perspective view of the bandage, illustrating the first step in applying the fastener. Figs. 2 and 3 are similar views illustrating subsequent steps, Fig. 2 showing the second step in applying the fastener, and in Fig. 3 the fastener is shown in its permanent or holding position. Fig. 4 is a sectional view, enlarged, of a portion of the bandage with the fastener applied thereto. Fig. 5 is a detail view of the fastener.

Referring to the drawings, the improved fastener consists of a substantially flat plate-like body A which is slotted inwardly at one end at B to form the parallel arms C and D which taper toward their rounded extremities C' and D', respectively. The inner edge c of arm C is smooth and straight as shown, while the corresponding edge of arm D is slightly off-set and is toothed or serrated as shown at d.

After applying the bandage strip E in the usual manner, its free end E' is turned backwardly and inwardly beneath the topmost course F of the wrapping to form a loop, the free end being thereby held to preserve the loop. Arm C of the fastener is then entered in the extremity of the loop as in Fig. 1, edge c of the arm engaging the loop end as shown. The fastener is then turned to place arm D beneath the looped end E', and in this position said arm D may be readily slipped beneath the last fold or wrapping G of the bandage as in Fig. 2. With the fastener in this position the serrated edge d readily enters beneath the same. The fastener is then turned back to the position shown in Fig. 3, with course G extending through slot B and over edge d to obtain the necessary biting hold on the strip. The inclination of holding edge d is such that the fastener will readily slide on the bandage in the direction in which the same is wrapped, as indicated by the arrow, Fig. 4, for tightening the bandage, but a reverse movement will be resisted by the biting hold of edge d. The bandage is thus securely held in the position desired and prevented from unwrapping, while at the same time it may be tightened by simply sliding it in the direction of the wrapping, arm C pulling the looped end of the bandage as will be understood. To release the bandage it is only necessary to turn the fastener over from the position shown in Fig. 3 to that of Fig. 2, when the fastener may slip backwardly on the bandage, or it may be entirely removed therefrom.

While the improved fastener may be used whenever a bandage is to be applied, it is intended especially for emergency use, sewing and tying being entirely dispensed with.

I claim:—

1. A fastener for surgical bandages comprising a substantially flat plate-like device slotted inwardly at one end to form parallel arms with the arms tapering in width toward the open end of the slot and formed with pointed extremities to facilitate entering the arms beneath the folds of the bandage, the inner edge of one arm being smooth and the inner edge of the other arm shaped to obtain a biting hold on the bandage, for the purpose described.

2. A surgical bandage fastener consisting of a member providing an end finger hold by which the member can be grasped and inserted in, removed from, slipped along and reversed on the bandage; said member embodying elongated thin flat longitudinal arms having their free ends reduced for easy insertion between piles of the bandage, one of said arms formed to permit free sliding contact with the bandage and the other arm having its longitudinal edge formed to bite and hold the bandage ply engaged thereby.

3. A surgical bandage adjusting and holding device consisting of a longitudinally-elongated approximately U-shaped comparatively-thin blade-like member the closed end of which forms a finger hold, the free ends of both arms of the member being reduced for insertion between different plies of the bandage.

4. A fastener for adjusting and holding a surgical bandage wrapped on a bandaged part, said fastener consisting of a member providing an end finger hold and two elongated flat blade-like longitudinal arms spaced apart to provide an intervening slot to receive the looped free end as well as an inner ply of the bandage, one of said arms formed to extend through the looped free end of the bandage to exert pull on the bandage in the direction in which it is wrapped around the bandaged part, the other arm having its free end shaped for ready insertion beneath a ply of the bandage and having its longitudinal edge formed to permit movement beneath said ply in the direction in which it is wrapped and to bite into the bandage against movement in the opposite direction, substantially as described.

In testimony whereof I affix my signature in presence of two witnesses.

REEVE H. BANKS.

Witnesses:
L. L. BANKS,
S. W. JACKSON.

Copies of this patent may be obtained for five cents each, by addressing the "Commissioner of Patents, Washington, D. C."